US012448128B2

(12) United States Patent
Rahn et al.

(10) Patent No.: US 12,448,128 B2
(45) Date of Patent: Oct. 21, 2025

(54) ADJUSTABLE CANTILEVER VEHICLE SEAT MOUNTING ASSEMBLIES AND SEAT SYSTEMS INCLUDING THE SAME

(71) Applicant: EMBRAER S.A., São José dos Campos (BR)

(72) Inventors: Brian Rahn, São José dos Campos (BR); Michael Priest, São José dos Campos (BR); Diego Rodriguez, São José dos Campos (BR); Steven Hellmann, São José dos Campos (BR); Borey Seng, São José dos Campos (BR)

(73) Assignee: EMBRAER S.A., São José Dos Campos—SP (BR)

( * ) Notice: Subject to any disclaimer, the term of this patent is extended or adjusted under 35 U.S.C. 154(b) by 350 days.

(21) Appl. No.: 18/318,543

(22) Filed: May 16, 2023

(65) Prior Publication Data

US 2023/0373634 A1     Nov. 23, 2023

Related U.S. Application Data

(60) Provisional application No. 63/342,777, filed on May 17, 2022.

(51) Int. Cl.
*B64D 11/06*        (2006.01)
(52) U.S. Cl.
CPC ........ *B64D 11/064* (2014.12); *B64D 11/0698* (2014.12)
(58) Field of Classification Search
CPC .... B64D 11/064; B64D 11/0698; B64D 11/06

USPC .......................................................... 297/14
See application file for complete search history.

(56) References Cited

U.S. PATENT DOCUMENTS

| 3,594,037 | A | * | 7/1971 | Sherman | ............ | B64D 11/0691 |
| | | | | | | 297/14 |
| 3,747,979 | A | * | 7/1973 | Barecki | .................. | B62D 47/02 |
| | | | | | | 244/122 R |
| 2003/0184129 | A1 | * | 10/2003 | Honda | ................. | B60N 2/3097 |
| | | | | | | 297/14 |

(Continued)

FOREIGN PATENT DOCUMENTS

| EP | 0563488 | A1 | * | 10/1993 | ............. | B61D 33/00 |
| GB | 2531167 | A | * | 4/2016 | ........... | B64D 11/064 |

*Primary Examiner* — Anthony D Barfield
(74) *Attorney, Agent, or Firm* — NIXON & VANDERHYE P.C.

(57) ABSTRACT

Seat mounting assemblies and vehicle seat systems which include the same are provided whereby a pivot bracket is operatively connected to a mounting bracket for reciprocal vertical movements while a tubular support member is operatively be associated with the pivot bracket so as to be pivotally movable about a substantially vertical central axis of the pivot bracket. A cantilevered support base arm is fixed to and extends outwardly from the tubular support member. An arm member is telescopically connected to the cantilevered support base arm to allow reciprocal rectilinear movements relative to the support base arm along a substantially horizontal axis thereof between retracted and extended positions thereof and carries a swivel plate at a distal end thereof to thereby allow swivel movements of a vehicle seat about a substantially vertical seat axis parallel to the substantially vertical central axis of the pivot bracket.

18 Claims, 3 Drawing Sheets

(56) References Cited

U.S. PATENT DOCUMENTS

2010/0218225 A1\* 8/2010 Wilcynski ............ B64D 11/064
725/76

\* cited by examiner

ADJUSTABLE CANTILEVER VEHICLE SEAT MOUNTING ASSEMBLIES AND SEAT SYSTEMS INCLUDING THE SAME

CROSS-REFERENCE TO RELATED APPLICATION

This application is based on and claims domestic priority benefits from U.S. Provisional Application Ser. No. 63/342,777 filed on May 17, 2022, the entire content of which is expressly incorporated hereinto by reference.

FIELD

The embodiments disclosed herein relate generally to vehicle seat mounting assemblies and seat systems, especially seat systems for executive aircraft passengers. In preferred forms, the vehicle seat mounting assemblies and systems according to the embodiments disclosed herein will be cantilevered to a vehicle's side wall structures and will provide the passenger with a range of positional seat adjustments.

BACKGROUND

Current vehicle seating systems require linear mechanisms that are stacked on top of one other so as to achieve the numerous degrees of freedom of movement that a vehicle occupant has come to expect in an executive seating environment. The seat is also attached to tracks that are fixed to the floor of the aircraft which thereby occupy space beneath the seat and create a feeling of confinement. One such proposal is provided by the seat systems disclosed in commonly owned U.S. patent application Ser. No. 18/307,398 filed on Apr. 26, 2023, the entire content of which is expressly incorporated hereinto by reference.

While the prior proposals for vehicle seat systems may be sufficient for their stated purposes, there is a continual need for improvement. Therefore, it would be highly desirable if an aircraft seat system could be provided that is cantilever mounted and will provide the passenger with a range of positional seat adjustments. It is towards providing such improvements that the embodiments disclosed herein are directed.

SUMMARY

Broadly, the embodiments disclosed herein are directed toward seat mounting assemblies and vehicle seat systems which include the same. According to certain embodiments, the mounting assembly is provided with a mounting bracket adapted to being rigidly attached to laterally adjacent vehicle structure (e.g., structural components of an aircraft fuselage) and a pivot bracket operatively connected to the mounting bracket for reciprocal vertical movements relative to the mounting bracket between raised and lowered positions thereof. A tubular support member may operatively be associated with the pivot bracket so as to be pivotally movable about a substantially vertical central axis of the pivot bracket. A cantilevered support base arm is fixed to the tubular support member at a proximal end thereof to allow for pivotal movements thereof about the substantially vertical central axis of the pivot bracket. The support base arm extends outwardly from the tubular support member along a substantially horizontal axis defined thereby. An arm member is telescopically connected to the cantilevered support base arm to allow reciprocal rectilinear movements relative to the support base arm along the substantially horizontal axis thereof between retracted and extended positions thereof. A swivel plate adapted to support a vehicle seat is connected to and carried by a distal end of the arm member so as to thereby allow swivel movements of the vehicle seat about a substantially vertical seat axis parallel to the substantially vertical central axis of the pivot bracket.

The mounting bracket may include slide rails while the pivot bracket may include a slide plate which is connected to the slide rails of the mounting bracket to allow the pivot bracket to be moved reciprocally between the raised and lowered positions thereof relative to the mounting bracket. An adjustment motor may operatively be interconnected to the slide plate of pivot bracket to move the slide plate between the raised and lowered positions thereof. According to an exemplary embodiment, the slide plate may include a toothed rack while the adjustment motor drives a pinion gear intermeshed with the toothed rack. Thus, depending on the rotational direction of the pinion gear, the slide plate (and hence the pivot bracket) will be moved upwardly/downwardly between the raised and lowered positions thereof.

Some embodiments will include a pivot bracket which defines a cylindrical interior space and an arcuate window such that the tubular support member is housed by the pivot bracket within the cylindrical interior space thereof. The cantilevered support base arm will therefore extend from the tubular support member through the arcuate window of the pivot bracket.

The pivot bracket may include a vertical hydraulic damper operatively associated with the tubular support member while a horizontal hydraulic damper may operatively be associated with the arm member. The hydraulic dampers thus serve to absorb forces that may be encountered during movement and/or occupation of the vehicle seat.

These and other aspects and advantages of the present invention will become clearer after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
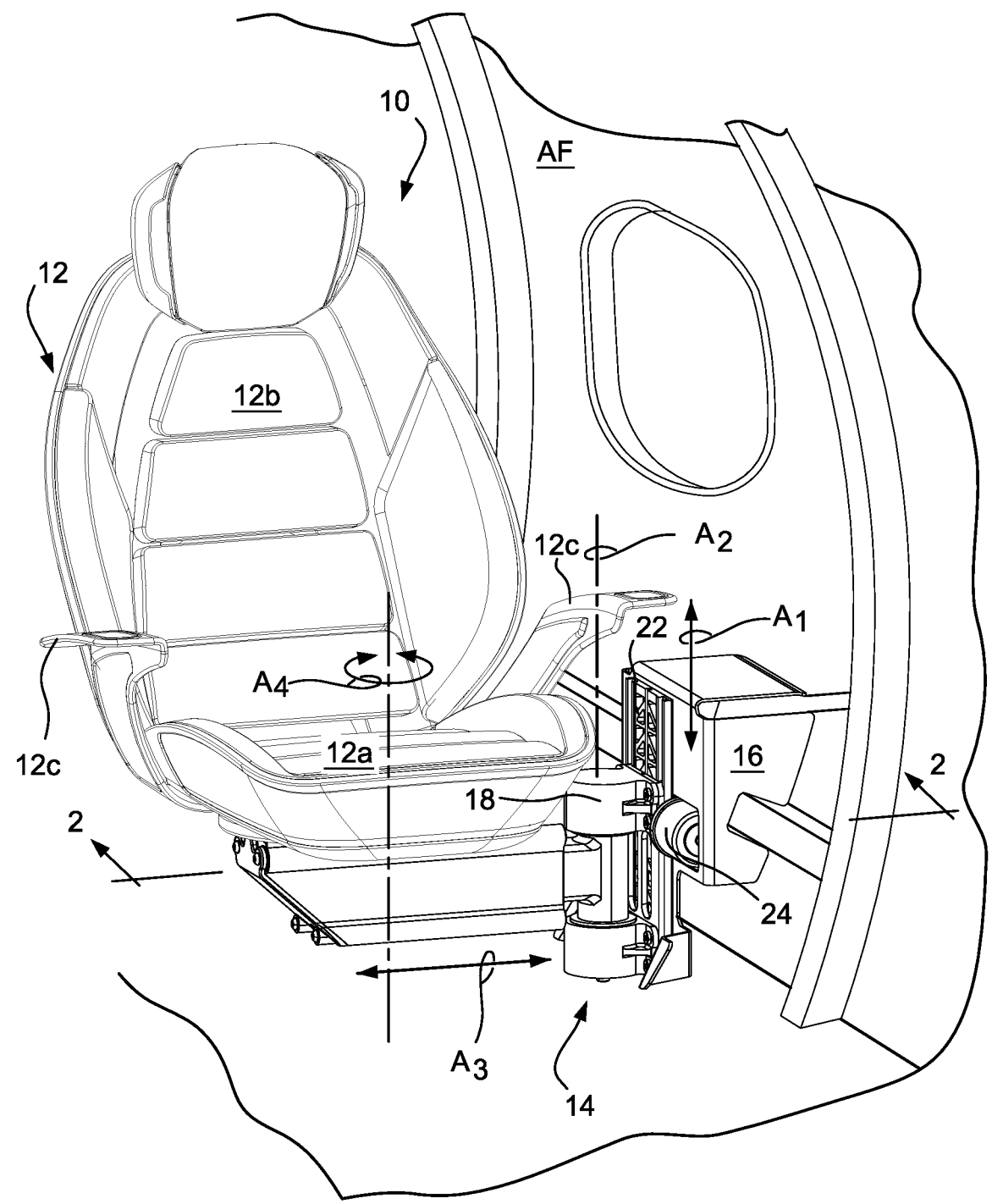
FIG. 1 is a perspective view of an aircraft seat system in accordance with an embodiment of the present invention.
Figure 2:
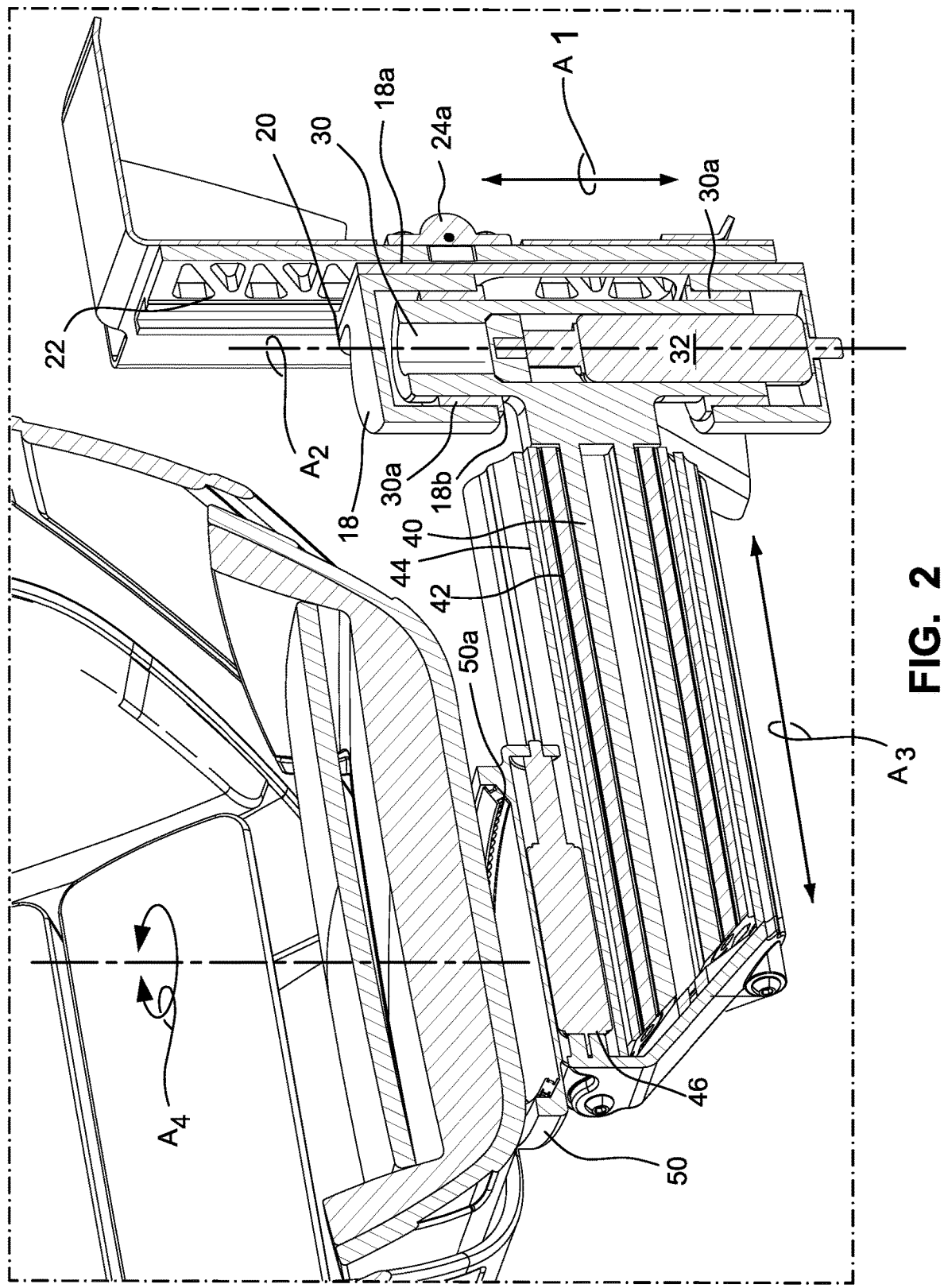
FIG. 2 is an enlarged cross-sectional elevational view of the seat mounting assembly employed in the aircraft seat system shown in FIG. 1 as taken along lines 2-2 therein.

Accompanying FIGS. 1 and 2 depict an aircraft seat system 10 installed in the interior of an aircraft fuselage AF which defines an interior cabin space in which a passenger seat 12 and a seat mounting assembly 14 are provided. The passenger seat 12 may include a bottom seat cushion 12a, a seat back 12b and a pair of arm rests 12c. The seat mounting assembly 14 is operably associated with a mounting bracket 16 that is rigidly affixed to side stringers and/or frame structures of the airframe associated with the aircraft fuselage AF so as to cantilever mount the seat assembly 12 to the aircraft fuselage. Although the embodiments described herein will be in reference to aircraft seat systems, especially seat systems for executive transport aircraft, it will be understood that the various structural assemblages could equivalently be employed in other vehicles, such as personal ground transportation vehicles and mass transit vehicles including busses and/or trains.

The structural elements of the seat mounting system 14 are perhaps better shown in accompanying FIG. 2. As will be seen therein, the seat mounting system includes a pivot bracket 18 that is rigidly fixed to a movable slide plate 20 mounted to slide rails 22 that are fixed to the mounting bracket 16 to allow the slide plate 20 to be reciprocally moveable along the slide rails 22 in a substantially vertical direction (arrow $A_1$ in FIGS. 1 and 2) between raised and lowered positions. In this regard, the pivot bracket 18 will carry a toothed rack 18a that is operatively meshed with a drive pinion gear 24a driven by an adjustment motor 24 (see FIG. 1). Thus, operation of the motor 24 will rotatably drive the pinion gear 24a and hence rectilinearly move the pivot bracket 18 upwardly or downwardly in the direction of arrow $A_1$ (i.e., depending on the rotational direction of the pinion gear 24a) by virtue of the pinion gear 24a being intermeshed with the toothed rack 18a so as to achieve the raised and lowered positions of the pivot bracket 18 and hence provide vertical adjustment to the seat 12.

The pivot bracket 18 defines a generally cylindrical interior space which internally houses a tubular support member 30 that is mounted therewithin for pivotal movements about a substantially vertical centerline axis of the pivot bracket 18 (arrow $A_2$ in FIGS. 1 and 2) by virtue of suitable rotational bearings 30a. A vertical hydraulic damper 32 is operatively mounted within the tubular support member 30 so as to dampen vertical load forces exerted on the pivot bracket in the direction of the arrow $A_1$.

An arcuate window 18b is defined by the pivot bracket 18 which allows a proximal end of a support base arm 40 to be rigidly attached to the tubular support member 30 and extend outwardly therefrom. The support base arm 40 telescopically carries an inner arm member 42 so as to allow the latter to be telescopically moved in substantially rectilinear horizontal directions relative to the former (arrow $A_3$ in FIGS. 1 and 2). An outer arm member 44 is connected to the inner arm member 42 so as to be telescopically movable therewith relative to the support base arm 40 so as to allow the seat assembly 12 to be moved towards and away from the side wall of the aircraft fuselage AF in the direction of arrow $A_3$. A horizontal hydraulic damper 46 is operatively associated with the outer arm member 44 so as dampen horizontal load forces exerted on the inner and outer arm members 42, 44, respectively, as well as the support base arm 40 in the direction of the arrow $A_3$.

The distal end of the outer support arm 44 is fixedly attached to a swivel plate 50 which in turn is operatively connected to the seat bottom 12a of the passenger seat 12 via an annular bearing ring 50a. The bearing ring 50a of the swivel plate 50 thereby allows the passenger seat 12 to be swiveled (arrow $A_4$ in FIGS. 1 and 2) about a substantially vertical axis which is parallel to the central vertical axis defined by the pivot bracket 18. Thus, the passenger seat 12 is mounted in a cantilever manner relative to the mounting bracket 16 via the pivot bracket 18 and the support base arm 40 and the inner and outer support arm members 42, 44 associated therewith.

Figure 3:
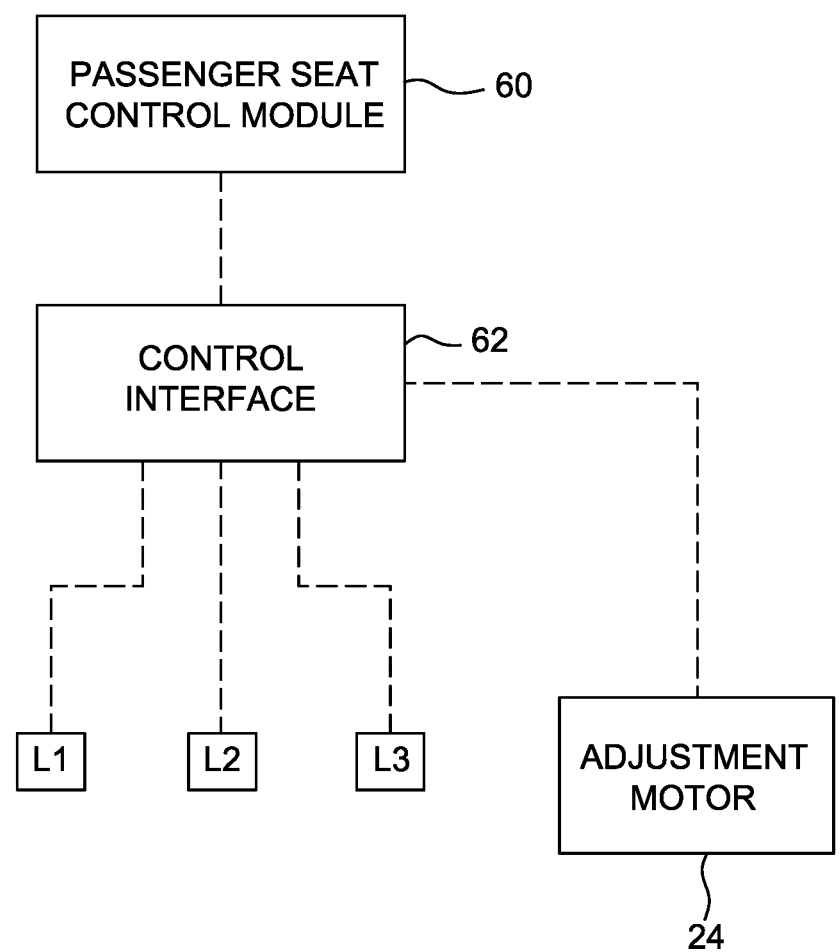
FIG. 3 is a schematic block diagram showing a seat position control system that may be employed operatively with the seat mounting assembly for the vehicle seat system shown in FIGS. 1 and 2.

As is shown in FIG. 3, the seat assembly 10 may be provided with a passenger seat control module 60 that provides an interface between a passenger seated in the passenger seat 12 and the seat mounting system 14 via a control interface 62. The passenger seat control module 60 may physically be positioned in one (or both) of the arm rests 12c to allow easy access and manipulation of the controls associated with the control module 60. The control interface 62 is in turn interconnected with the adjustment motor 24 so as to operate the motor 24 as desired to raise/lower the passenger seat 12 in the direction of arrow $A_1$. The control interface 62 is also interconnected with individual position locks L1, L2 and L3 which are operatively associated with the tubular support member 30, the inner and outer support arm members 42, 44 and the swivel plate 50 so as to positionally lock such structures against movements in the directions of arrows $A_2$, $A_3$ and $A_4$, respectively. Thus, during use, vertical adjustments in the direction of arrow $A_1$ is achieved by the passenger commanding operation of the adjustment motor 24 until a desired vertical height is achieved between the raised and lowered positions thereof. Such a desired vertical height of the seat will thus be maintained when the motor 24 is not actively operative. The passenger may also simultaneously or sequentially manually move the seat in the directions of arrows $A_2$, $A_3$ and $A_4$ until a desired seat position is achieved following which the position locks L1, L2 and L3 may respectively be activated to maintain the desired seat position.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A mounting assembly for a vehicle passenger seat comprising:
    a mounting bracket adapted to being rigidly attached to laterally adjacent vehicle structure;
    a pivot bracket operatively connected to the mounting bracket for reciprocal vertical movements relative to the mounting bracket between raised and lowered positions thereof;
    a tubular support member operatively associated with the pivot bracket and pivotally movable about a substantially vertical central axis of the pivot bracket;
    a cantilevered support base arm having a proximal end fixed to the tubular support member to allow for pivotal movements thereof about the substantially vertical central axis of the pivot bracket and extending outwardly from the tubular support member along a substantially horizontal axis defined thereby;
    an arm member telescopically connected to the cantilevered support base arm to allow reciprocal rectilinear movements relative to the support base arm along the substantially horizontal axis thereof between retracted and extended positions thereof, and
    a swivel plate connected to and carried by a distal end of the arm member, the swivel plate being adapted to support a vehicle seat and allowing swivel movements of the vehicle seat about a substantially vertical seat axis parallel to the substantially vertical central axis of the pivot bracket.

2. The mounting assembly according to claim 1, wherein the mounting bracket includes slide rails, and wherein the pivot bracket includes a slide plate which is connected to the slide rails of the mounting bracket to allow the pivot bracket to be moved reciprocally between the raised and lowered positions thereof relative to the mounting bracket.

3. The mounting assembly according to claim 2, further comprising an adjustment motor operatively interconnected to the slide plate of pivot bracket to move the slide plate between the raised and lowered positions thereof.

4. The mounting assembly according to claim 3, wherein
the slide plate includes a toothed rack, and wherein
the adjustment motor drives a pinion gear intermeshed with the toothed rack.

5. The mounting assembly according to claim 1, wherein
the pivot bracket defines a cylindrical interior space and an arcuate window, and wherein
the tubular support member is housed by the pivot bracket within the cylindrical interior space thereof, and wherein
the cantilevered support base arm extends from the tubular support member through the arcuate window of the pivot bracket.

6. The mounting assembly according to claim 5, wherein the pivot bracket includes a vertical hydraulic damper operatively associated with the tubular support member.

7. The mounting assembly according to claim 1, further comprising a horizontal hydraulic damper operatively associated with the arm member.

8. A vehicle seat system comprising:
a vehicle passenger seat, and
the mounting assembly according to claim 1, wherein the vehicle seat is operatively connected to and carried by the swivel plate of the mounting assembly.

9. The vehicle seat system according to claim 8, further comprising a passenger seat control module to maintain a selected desired seat position.

10. The vehicle seat system according to claim 9, wherein the passenger seat control module is mounted to the vehicle passenger seat.

11. An aircraft comprising a fuselage defining an interior cabin space, and the vehicle seat system according to claim 8 mounted to side wall structural components of the fuselage.

12. An aircraft seat system comprising:
a passenger seat, and
a mounting assembly operatively connected to the passenger seat to allow positional adjustments thereof, wherein the mounting assembly comprises:
(i) a mounting bracket adapted to being rigidly attached to laterally adjacent fuselage structure of an aircraft;
(ii) a pivot bracket operatively connected to the mounting bracket for reciprocal vertical movements relative to the mounting bracket between raised and lowered positions thereof;
(iii) a tubular support member operatively associated with the pivot bracket and pivotally movable about a substantially vertical central axis of the pivot bracket;
(iv) a cantilevered support base arm having a proximal end fixed to the tubular support member to allow for pivotal movements thereof about the substantially vertical central axis of the pivot bracket and extending outwardly from the tubular support member along a substantially horizontal axis defined thereby;
(v) an arm member telescopically connected to the cantilevered support base arm to allow reciprocal rectilinear movements relative to the support base arm along the substantially horizontal axis thereof between retracted and extended positions thereof, and
(vi) a swivel plate connected to and carried by a distal end of the arm member, the swivel plate being operatively connected to the passenger seat to allow swivel movements of the passenger seat about a substantially vertical seat axis parallel to the substantially vertical central axis of the pivot bracket.

13. The aircraft seat system according to claim 12, wherein
the mounting bracket includes slide rails, and wherein
the pivot bracket includes a slide plate which is connected to the slide rails of the mounting bracket to allow the pivot bracket to be moved reciprocally between the raised and lowered positions thereof relative to the mounting bracket.

14. The aircraft seat system according to claim 13, further comprising an adjustment motor operatively interconnected to the slide plate of pivot bracket to move the slide plate between the raised and lowered positions thereof.

15. The aircraft seat system according to claim 14, wherein
the slide plate includes a toothed rack, and wherein
the adjustment motor drives a pinion gear intermeshed with the toothed rack.

16. The aircraft seat system according to claim 12, wherein
the pivot bracket defines a cylindrical interior space and an arcuate window, and wherein
the tubular support member is housed by the pivot bracket within the cylindrical interior space thereof, and wherein
the cantilevered support base arm extends from the tubular support member through the arcuate window of the pivot bracket.

17. The aircraft seat according to claim 16, wherein the pivot bracket includes a vertical hydraulic damper operatively associated with the tubular support member.

18. The aircraft seat according to claim 12, further comprising a horizontal hydraulic damper operatively associated with the arm member.

* * * * *